United States Patent [19]

Fujimaki et al.

[11] 4,396,743

[45] Aug. 2, 1983

[54] RUBBER COMPOSITION FOR TIRES CONTAINING BLOCK COPOLYMER HAVING VINYL BONDS

[75] Inventors: Tatsuo Fujimaki, Kodaira; Tomoharu Yamada; Seisuke Tomita, both of Higashimurayama, all of Japan

[73] Assignee: Bridgestone Tire Company Limited, Tokyo, Japan

[21] Appl. No.: 334,049

[22] Filed: Dec. 23, 1981

[30] Foreign Application Priority Data

Dec. 26, 1980 [JP] Japan ................................ 55-183745

[51] Int. Cl.³ .......................... C08L 9/06; C08L 53/02
[52] U.S. Cl. .................................. 525/99; 152/209 R; 525/914; 525/314
[58] Field of Search ....................... 525/99; 152/209 R

[56] References Cited

U.S. PATENT DOCUMENTS 4,192,366  3/1980  Scriver et al. .................. 152/209 R

FOREIGN PATENT DOCUMENTS 2039495  8/1980  United Kingdom .................. 525/99

Primary Examiner—Wilbert J. Briggs, Sr.
Attorney, Agent, or Firm—Sughrue, Mion, Zinn, Macpeak, and Seas

[57] ABSTRACT

A rubber composition adapted to be used as a tread rubber is disclosed. The rubber composition has remarkably improved resistance against heat generation, breakage resistance, wear resistance, wet skid resistance and low-temperature brittleness, and consists mainly of a rubber blend consisting of 20–95 parts by weight of a styrene-butadiene block copolymer having a specifically limited structure and 80–5 parts by weight of a diene rubber.

2 Claims, 1 Drawing Figure

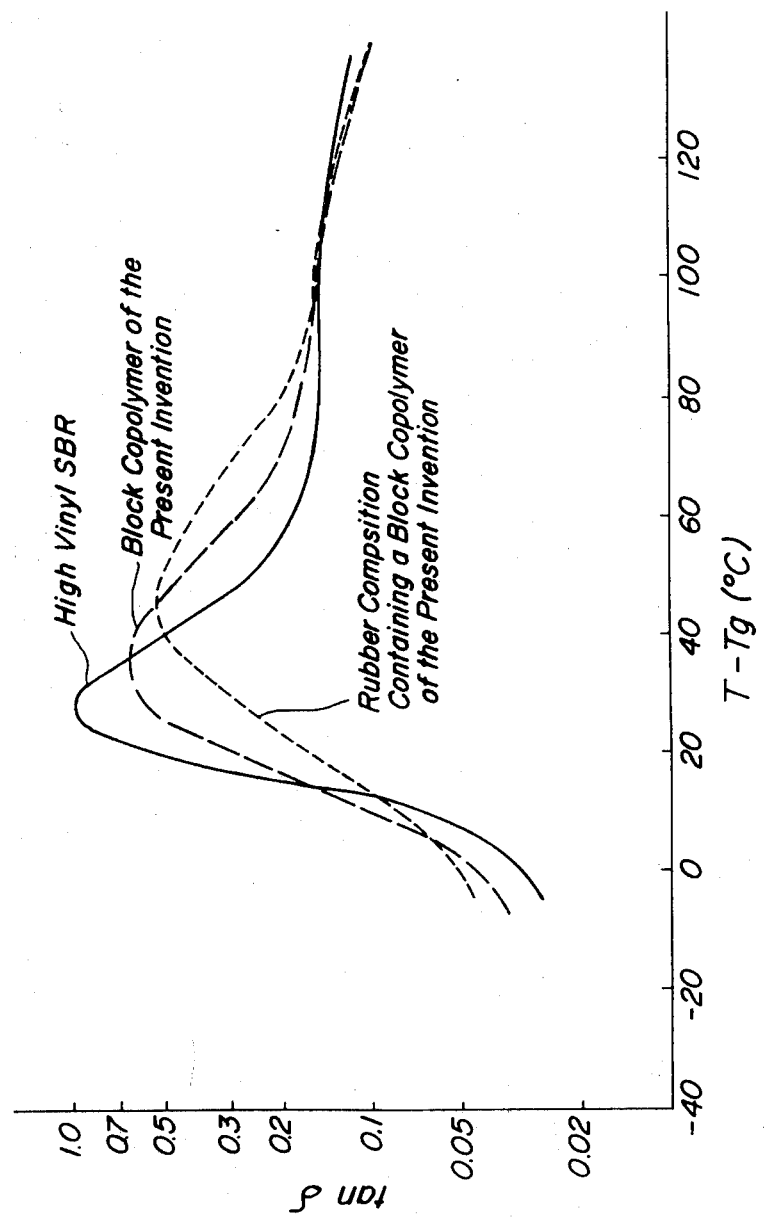

RUBBER COMPOSITION FOR TIRES CONTAINING BLOCK COPOLYMER HAVING VINYL BONDS

BACKGROUND OF THE INVENTION

(1) Field of the Invention

The present invention relates to a rubber composition suitable for pneumatic tires which concurrently achieves satisfactory rolling resistance, wet skid resistance, breakage resistance and wear resistance.

(2) Description of the Prior Art

Recently, resource saving and energy saving have been socially demanded and investigations for developing so-called low fuel consumption tires have been eagerly carried out in order to reduce power loss is reduced.

It has been generally known that an automobile provided with a tire having a low rolling resistance is low in gasoline consumption. This tire is a so-called low fuel-consumption tire. In order to lower the rolling resistance, materials generally used have a low glass transition temperature, such as cis-polybutadiene rubber and the like, have a low hysteresis loss, such as natural rubber and the like, as a tread rubber.

However, these rubbers are extremely low in the running stability, such as braking performance on a wet road and wet driving performance. It has been very difficult to concurrently achieve a satisfactory running stability on a wet road along with a satisfactory rolling resistance.

Recently, it has been known, as described in Japanese Patent Laid-open Application No. 62,248/79 (corresponding to U.S. Pat. No. 4,334,567), to improve rolling resistance and running stability by using only styrene-butadiene copolymer (SBR) having a styrene content of 20–40% by weight and a 1,2-bond content in the bonded butadiene of 50–80% by weight, but all of the polymer consists of said SBR, so that satisfactory results have not always been obtained. Thus, since all of the polymer consists of said SBR, running stability is improved over prior SBR but the rolling resistance is not yet satisfactory. Moreover, in this prior art, conventional solution polymerization-type SBR obtained by using organolithium compound is used. Therefore, a rubber composition containing the SBR is poor in the breakage strength and in the elongation at break. Hence various problems arise in the running of the tire or in the production of the tire. The former problem is the formation of cuts and cracks on the tread surface during the running of the tire on nonpaved road. The latter problem is the breakage of the tread caused by the mold when a vulcanized tire is taken out from the mold, that is, so-called tread scratch formed by the mold. Furthermore, the above described SBR has a glass transition temperature higher than that of conventional SBR, and therefore the rubber composition containing the above described SBR is apt to harden during running in a cold region or in winter. The tire tread often fails due to the low-temperature brittleness.

Accordingly, a rubber composition concurrently achieves satisfactory rolling resistance and running stability while maintaining excellent breakage and wear resistances has not been developed.

The inventors have diligently tried to solve the above described drawbacks and noticed, as described in U.S. patent application Ser. No. 231,529, now abandoned, that the deformation at the friction surface of the tread occurs at high speed, and the hysteresis loss in the deformation at high speed has a great influence on the friction force, that is, the running stability of the tire, while the deformation of the tread owing to ground contact, which has a great influence on the rolling resistance of the tire, corresponds to the rotation speed of the tire, so that the hysteresis loss at the deformation of less than 100 Hz has a great influence on the rolling resistance. According to the temperature-time deducibility by Williams, Landel and Ferry, it is supposed that the hysteresis loss at high speed controlling the running stability conforms to the hysteresis loss measured at a lower temperature than the temperature at which the tire is used, and hence the inventors have made study concerning the condition under which the hysteresis loss is made to be larger in order to improve the running stability and found that when the hysteresis loss measured at about 0° C. in the dynamic measurement of 1.5 Hz is larger and the hysteresis loss at 50°–70° C. is smaller, rubber compositions wherein both the running stability and low rolling resistance are concurrently improved, can be obtained.

Based on the above described discovery, the inventors have disclosed in U.S. patent application Ser. No. 231,529 that high vinyl SBR having a 1,2-bond content in butadiene unit of not less than 60% by weight can somewhat improve concurrently the low rolling resistance and running stability. However, since such high vinyl SBR is insufficient in the breakage resistance and wear resistance, the high vinyl SBR must be blended with other diene rubber. Moreover, unless a large amount of other diene rubber is blended, the resulting rubber cannot be practically used. As the results, when high vinyl SBR is used, the resulting rubber composition is satisfactory in the rolling resistance, but is poor in the running stability.

The inventors have further disclosed in U.S. patent application Ser. No. 251,843, now abandoned, that a rubber composition consisting mainly of an amorphous gradient high vinyl butadiene-styrene copolymer rubber having an average content of 1,2-bond in butadiene unit being not less than 60% by weight, in which copolymer the 1,2-bond content uniformly varies along the molecular chain of the copolymer, can improve the running stability and low rolling resistance of a tire while maintaining the breakage strength of the tire.

However, the high vinyl SBR disclosed in U.S. patent application Ser. Nos. 231,529 and 251,843 is compatible with natural rubber and synthetic isoprene rubber, but is not compatible with polybutadiene rubber and ordinary styrene-butadiene copolymer rubber. Therefore, the high vinyl SBR cannot be mixed with all of the general purpose rubbers, which are widely used in the tire industry, in the same mixing ratio. When polymers constituting a rubber composition are not compatible with each other, the shape of the tan δ-temperature curve of the rubber composition is varied due to the variation in the kneading operation during the production of tire, to cause variation of tan δ at 0° C. As a result, running stabilities, such as wet skid resistance and the like, are varied in every tire due to the difference in the production step.

While, an A-B type block BR consisting of blocks having different vinyl bond contents, and an A-B type block SBR consisting of blocks having different bonded styrene contents and having different vinyl bond contents in the butadiene unit, which are disclosed in Japanese Patent Application Publication No. 37,415/74, have improved wet skid resistance and low rolling resistance.

However, although such block BR has improved wet skid resistance and low rolling resistance, the block BR is not compatible with all of the general purpose rubbers. Therefore, the use of the block BR in a rubber composition for tire tread is not satisfactory in view of the unstableness of tire performances, such as wet skid resistance and the like, and the poor breakage strength, low-temperature brittleness and the like in the rubber composition.

However, the running stability of a tire on a wet highway road surface becomes a more and more important property of the tire in view of safety, and the development of low fuel consumption tires having high performance has been basically for resource saving. Bearing these problems in mind, the inventors have made various investigations with respect to styrene-butadiene copolymer rubber in order to further improve the breakage strength, low rolling resistance and running stability of tire, and ascertained that the above described various properties can be improved by the use of a specifically limited rubber composition consisting mainly of a rubber containing at least 20 parts by weight, based on 100 parts by weight of the rubber, of a block copolymer having a specifically limited microstructure, and accomplished the present invention.

SUMMARY OF THE INVENTION

The feature of the present invention is the provision of a rubber composition adapted to be used in a tire tread and having remarkably improved resistance against heat generation, breakage resistance, wear resistance, wet skid resistance and low-temperature brittleness, which consists mainly of a rubber blend consisting of 20–95 parts by weight of a styrene-butadiene block copolymer and 80–5 parts by weight of a diene rubber; said styrene-butadiene block copolymer being a copolymer obtained by block copolymerizing styrene with 1,3-butadiene, consisting of a random copolymer block (A) and a random copolymer block (B), the fraction of the copolymer block (A) being 10–90% by weight, and having a total bonded styrene content of 10–40% by weight and a total vinyl bond content in the total bonded butadiene unit of 25–70% by weight; said random copolymer block (A) having a bonded styrene content of 20–50% by weight and a vinyl bond content in the butadiene unit of 40–75% by weight; and said random copolymer block (B) having a bonded styrene content of not higher than 10% by weight and a vinyl bond content in the butadiene unit of 20–50% by weight.

BRIEF DESCRIPTION OF THE DRAWING

FIG. 1 is a graph illustrating a relation between the temperature (T-Tg) (°C.), which has been corrected the measured temperature T (°C.) by the glass transition temperature Tg (°C.), and the hysteresis loss (tan δ) of a high vinyl SBR, a block copolymer of the present invention and a rubber composition containing the block copolymer of the present invention.

DESCRIPTION OF THE PREFERRED EMBODIMENT

The block copolymer to be used in the present invention contains 20–50% by weight of bonded styrene in one of the blocked chains (hereinafter, one of the blocked chains may be referred to as blocked chain (A) or block (A) and another may be referred to as blocked chain (B) or block (B)) and has a total bonded styrene content of 10–40% by weight. The reason is as follows. It is known that the breakage strength of styrene-butadiene rubber is highly influenced by the styrene content, and the breakage strength of ordinary styrene-butadiene random copolymer is increased corresponding to the styrene content of the copolymer and the increase of the breakage strength is saturated when the styrene content is about 20% by weight. However, the block copolymer of the present invention has satisfactorily high breakage strength and wear resistance when the copolymer has a bonded styrene content of 20–50% by weight in the blocked chain (A) and further has a total bonded styrene content of 10–40% by weight. Therefore, when the block copolymer of the present invention is same as the ordinary styrene-butadiene random copolymer in the breakage strength, the bonded styrene content in the block copolymer of the present invention is smaller than that in the ordinary styrene-butadiene random copolymer, and moreover the blocked copolymer is superior to the random copolymer in the resistance against heat generation. When the bonded styrene content in the blocked chain (A) is higher than 50% by weight, a rubber composition containing the block copolymer of the present invention has a large hysteresis loss (tan δ) at about 0° C. and has an improved running stability, but at the same time the rubber composition has a large hysteresis loss (tan δ) at 50°–70° C. and is poor in the rolling resistance. Therefore, the use of a block copolymer having a bonded styrene content of higher than 50% by weight in the blocked chain (A) is not preferable.

Further, it is very important in the present invention that two blocks contained in one molecular chain have appropriately different glass transition temperatures and are compatible with each other. In a rubber blend consisting of fellow sytrene-butadiene copolymers having different bonded styrene contents and different vinyl bond contents in the butadiene unit with each other, or consisting of a styrene-butadiene copolymer and a diene rubber, when the polymers constituting the rubber blend are different from each other in both the content of bonded styrene and the content of vinyl bond in an amount of at least 20% by weight, the polymers are not incorporated with each other, and the temperature-dependent curve of tan δ (tan δ-temperature curve) of the rubber blend, which is obtained by measuring the dynamic viscoelasticity of the rubber blend, has separate peaks inherent to the polymers constituting the rubber blend. However, in the block copolymer of the present invention, two blocks having different glass transition temperatures are bonded with each other in one molecular chain and are intramolecularly compatibilized. As a result, the two blocks are completely compatibilized by the rising of temperature during the vulcanization step and the compatibilized state is fixed by the crosslinkage formed during the vulcanization step, and the tan δ-temperature curve of the block copolymer has a single peak having a broad half value width.

When a polymer having a broad peak of tan δ is used, the running stabilities, such as wet skid resistance and the like, of a rubber composition can be improved. The reason is that, as described above, when the value of tan δ at 0° C. of a polymer is increased, the wet skid resistance of a rubber composition can be improved. In the conventional method, the Tg of a polymer is raised, whereby the temperature, at which the tan δ of the polymer exhibits a peak, is approached to 0° C. However, this method has the following drawbacks.

Firstly, a tread rubber which uses a rubber composition formed of such polymer is damaged during the use in a cold district or in winter, that is, the rubber composition is poor in the low-temperature brittleness. Further, the input for tread rubber of a tire acts as a constant stress when the tire is braked or driven, and therefore rapid increase of elasticity in the main dispersion region suppresses the deformation caused in a tire tread corresponding to the very small unevenness of road surface to decrease the substantial contact area of the tread rubber with the road surface, and the wet skid resistance of the rubber composition cannot be sufficiently improved.

Therefore, the broad shape of the peak of tan δ of the block copolymer according to the present invention causes gentle increase of modulus in the glass transition region of a rubber composition containing the polymer, and both the low-temperature brittleness and the wet skid resistance of the rubber composition can be improved.

Further, it is very important in the present invention that the block copolymer is compatible with other diene rubbers. When the block copolymer of the present invention is not compatible with other diene rubber, the rubber composition containing the rubber blend has neither improved low-temperature brittleness nor improved wet skid resistance. Natural rubber and cis-polybutadiene rubber have high resistance against heat generation, and these rubbers are often blended with the block copolymer in order to obtain a rubber composition having an excellent rolling resistance. Further, emulsion SBR is blended with the block copolymer in order to obtain an inexpensive rubber composition. It is desirable that the block copolymer of the present invention is compatible with these general purpose rubbers to give a single broad peak in the tan δ-temperature curve of the resulting rubber blend.

When the bonded styrene content in the block (B) is not higher than 10% by weight in a block copolymer of the present invention, if the vinyl bond content in the butadiene unit is increased, the compatibility of the block copolymer with natural rubber increases, but if the vinyl bond content is less than 20% by weight, the block copolymer is poor in the compatibility with NR. The compatibility of the block copolymer with cis-polybutadiene is poor when the vinyl bond content of the block copolymer exceeds 50% by weight. While, when the bonded styrene content in the block (B) exceeds 10% by weight, the block copolymer is not at all compatible with both NR and BR. Emulsion SBR has a Tg which lies between the Tgs of both the blocked chains constituting the block copolymer of the present invention. Therefore, the rubber blend gives a single peak of tan δ.

In the present invention, the vinyl bond content in the butadiene unit in the block (A) is limited to 40-75% by weight. The reason is as follows. When the content is less than 40% by weight, the Tg of the block (A) approaches to the Tg of the block (B), and a sufficiently broad peak of tan δ cannot be obtained, and moreover the tan δ at 0° C. of the block copolymer is not large enough to improve the wet skid resistance of a rubber composition. While, when the vinyl bond content exceeds 75% by weight, the block copolymer has a large tan δ at 0° C. and can give a rubber composition having an improved running stability, but at the same time the block copolymer has a large tan δ at 50°-70° C. and gives a rubber composition having a poor rolling resistance.

The block copolymer to be used in the present invention has a total bonded styrene content of 10-40% by weight and a total vinyl bond content in the total bonded butadiene unit of 25-70% by weight as an averaged value of the contents of these bonds in the blocked chains (A) and (B). When the total vinyl bond content exceeds 70% by weight and at the same time the total bonded styrene content exceeds 40% by weight, the copolymer has an excessively high Tg and becomes a resinous polymer which does not act as an ordinary elastomer. Therefore, a rubber composition containing the block copolymer has an excessively high modulus, and is poor in the vibration performance and in the ride feeling. Further, the rubber composition is poor in the elongation at break, and a tread made of the rubber composition is often damaged due to the poor elongation at break. Therefore, such copolymer is not suitable to be used in a rubber composition for tire tread.

When either the total bonded styrene content exceeds 40% by weight, or the total vinyl bond content exceeds 70% by weight in a block copolymer, the copolymer has a large tan δ at 50°-70° C., and the resulting rubber composition is poor in the rolling resistance.

Further, when the block copolymer to be used in the present invention is formed into such a structure, wherein the vinyl bond content in the butadiene unit varies uniformly along the molecular chain of the copolymer as described in U.S. patent application Ser. No. 251,843, the block copolymer has more improved compatibility, and good low-temperature brittleness and wet skid resistance can be expected in the rubber blend.

The diene rubbers to be used in the present invention include natural rubber, synthetic polyisoprene rubber, styrene-butadiene copolymer rubber and cis-polybutadiene rubber, which are compatible with block copolymer of the present invention. Among these rubbers, ones having a Tg of not higher than −50° C. are preferably used. At least one of these diene rubbers is blended with the block copolymer of the present invention depending upon the object and use purpose, and used.

The amount of the block copolymer of the present invention to be contained in a rubber component must be 20-80 parts by weight based on 100 parts by weight of the rubber component. When the amount of the block copolymer is less than 20 parts by weight, the effect of the block copolymer does not appear. While, when the amount of the copolymer rubber exceeds 80 parts by weight, the resulting rubber component has the same physical properties as those of the block copolymer alone, and the effect of the microstructure of the block copolymer of the present invention, which aims to obtain a high compatibility of the rubber component with diene rubber and to obtain a broad peak width in the value of tan δ, is poor. Further, when the amount of the block copolymer exceeds 95 parts by weight, the effect of the use of the block copolymer do not appear at all.

In the present invention, it is preferable to incorporate 1-40 parts by weight of a softening agent and 5-70 parts by weight of carbon black based on 100 parts by weight of the rubber component and when the softening agent exceeds 40 parts by weight and carbon black exceeds 70 parts by weight, resulting rubber composition is poor in the breakage resistance, in the resistance against heat generation and in the rolling resistance, and further is damaged due to the formation of cut and the like during the running of tire. Therefore, the use of such amount of softening agent or carbon black is not preferable.

Further, in the rubber compositions of the present invention, compounding agents used in the usual rubber industry, such as vulcanizing agent, accelerating agent, promoter assitant, antioxidant and the like may be incorporated.

The rubber compositions of the present invention are excellent in the wear resistance and breakage resistance and further have noticeably improved low rolling resistance, running stability and low-temperature brittleness. Moreover, the rubber compositions are stable in these properties against the variation of kneading step at the production of tire, and are appropriate rubber compositions for tire tread.

The following examples are given for the purpose of illustration of this invention and are not intended as limitations thereof.

EXAMPLE 1

Into a reaction vessel having a capacity of 5 l were charged under a nitrogen atmosphere 2,000 g of a mixture of cyclohexane/n-hexane (weight ratio: 90/10) and given amounts of styrene, butadiene, tetrahydrofuran and potassium dodecylbenzenesulfonate, and the resulting mixture was subjected to an isothermic or adiabatic polymerization in the presence of n-butyllithium as a polymerization initiator under a condition for forming a block (A) shown in the following Table 1. After the conversion in the polymerization reaction was reached 95–100%, given amounts of butadiene, styrene and tetrahydrofuran were further added to the reaction system, and the resulting mixture was subjected to a polymerization reaction under a condition for forming a block (B) shown in Table 1 to produce a block copolymer consisting of the blocked chains (A) and (B). After completion of the polymerization, 0.7 part by weight of 2,6-di-tertiary-butyl-p-cresol was added to 100 parts by weight of the resulting polymer, and the solvent was removed from the reaction system by steam stripping, and then the resulting product was dried on a roll kept at 100° C. to obtain a polymer. The polymerization condition and the property of the resulting polymer are shown in Table 1.

TABLE 1(a)-1

| Copolymer | | Present invention A | Comparative copolymer B | Comparative copolymer C | Comparative copolymer D | Comparative copolymer E | Comparative copolymer F | Comparative copolymer G | Comparative copolymer H |
|---|---|---|---|---|---|---|---|---|---|
| Amount of n-BuLi* (g) | | 0.27 | 0.26 | 0.25 | 0.28 | 0.36 | 0.27 | 0.35 | 0.31 |
| Polymerization condition for forming block (A) | Butadiene/styrene (g) | 175/75 | 175/75 | 212.5/37.5 | 175/75 | 100/150 | 100/25 | 225/225 | 45/30 |
| | Tetrahydrofuran (g) | 12 | 30 | 10 | 1.5 | 20 | 4 | 12 | 6 |
| | Potassium dodecylbenzenesulfonate (g) | — | — | — | — | — | — | 1.7 | — |
| | Polymerization temperature (°C.) | 50 | 20 | 50 | 50 | 50 | 50 | 50 | 50 |
| Polymerization condition for forming block (B) | Butadiene/styrene (g) | 237.5/12.5 | 237.5/12.5 | 237.5/12.5 | 237.5/12.5 | 237.5/12.5 | 375/0 | 50/0 | 382.5/42.5 |
| | Tetrahydrofuran (g) | 1.2 | 1.2 | 1.2 | 1.2 | 1.2 | 2.4 | 1.6 | 0.3 |
| | Polymerization temperature (°C.) | 50 | 50 | 50 | 50 | 50 | 50 | 50 | 50 |

TABLE 1(b)-1

| Copolymer | | Comparative copolymer I | Comparative copolymer J | Comparative copolymer O | Present invention L | Comparative copolymer M | Present invention K | Comparative copolymer N | Comparative copolymer P |
|---|---|---|---|---|---|---|---|---|---|
| Amount of n-BuLi* (g) | | 0.27 | 0.26 | 0.27 | 0.32 | 0.34 | 0.31 | 0.30 | Emulsion polymerization |
| Polymerization condition for forming block (A) | Butadiene/styrene (g) | 320/80 | 400/100 | 475/25 | 45/30 | 19/16 | 150/100 | 350/150 | |
| | Tetrahydrofuran (g) | 15 | 4 | 1.2 | 15 | 15 | 15 | 12 | |
| | Potassium dodecylbenzenesulfonate (g) | — | — | — | — | — | — | — | |
| | Polymerization temperature (°C.) | 30 | 50 | 50 | 20 | 20 | 20 | 50 | |
| Polymerization condition for forming block (B) | Butadiene/styrene (g) | 100/0 | — | — | 403.5/21.5 | 419/46 | 250/0 | — | |
| | Tetrahydrofuran (g) | 6 | — | — | 1.2 | 1.2 | 1.0 | — | |
| | Polymerization temperature (°C.) | 50 | — | — | 50 | 50 | 50 | — | |

TABLE 1(a)-2

| Copolymer | Present invention A | Comparative copolymer B | Comparative copolymer C | Comparative copolymer D | Comparative copolymer E | Comparative copolymer F | Comparative copolymer G | Comparative copolymer H |
|---|---|---|---|---|---|---|---|---|
| Block (A) | | | | | | | | |

TABLE 1(a)-2-continued

| Copolymer | Present invention A | Comparative copolymer B | Comparative copolymer C | Comparative copolymer D | Comparative copolymer E | Comparative copolymer F | Comparative copolymer G | Comparative copolymer H |
| --- | --- | --- | --- | --- | --- | --- | --- | --- |
| Bonded styrene content (wt. %) | 30 | 30 | 15 | 30 | 60 | 20 | 50 | 40 |
| Vinyl bond content (wt. %) | 50 | 80 | 50 | 30 | 50 | 40 | 45 | 40 |
| Block (B) | | | | | | | | |
| Bonded styrene content (wt. %) | 6 | 6 | 6 | 6 | 6 | 0 | 0 | 8 |
| Vinyl bond content (wt. %) | 30 | 30 | 30 | 30 | 30 | 40 | 35 | 20 |
| Total content of bonded styrene and total content of vinyl bond | | | | | | | | |
| Bonded styrene content (wt. %) | 18 | 18 | 10.5 | 18 | 33 | 5 | 45 | 12 |
| Vinyl bond content (wt. %) | 40 | 55 | 40 | 30 | 40 | 40 | 44 | 21 |
| Fraction of block (A) (wt. %) | 50 | 50 | 50 | 50 | 50 | 25 | 90 | 15 |

Solvent: cyclohexane/n-hexane (weight ratio: 90/10) 2,000 g
*n-BuLi: n-butyllithium TABLE 1(b)-2

| Copolymer | Comparative copolymer I | Comparative copolymer J | Comparative copolymer O | Present invention L | Comparative copolymer M | Present invention K | Comparative copolymer N | Comparative copolymer P |
| --- | --- | --- | --- | --- | --- | --- | --- | --- |
| Block (A) | | | | | | | | |
| Bonded styrene content (wt. %) | 18 | — | — | 40 | 45 | 40 | — | — |
| Vinyl bond content (wt. %) | 70 | — | — | 70 | 70 | 70 | — | — |
| Block (B) | | | | | | | | |
| Bonded styrene content (wt. %) | 0 | — | — | 6 | 8 | 0 | — | — |
| Vinyl bond content (wt. %) | 48 | — | — | 30 | 30 | 30 | — | — |
| Total content of bonded styrene and total content of vinyl bond | | | | | | | | |
| Bonded styrene content (wt. %) | 14 | 18 | 6 | 11.1 | 10.5 | 20 | 30 | 23.5 |
| Vinyl bond content (wt. %) | 66 | 40 | 30 | 36.0 | 32.8 | 50 | 50 | 18 |
| Fraction of block (A) (wt. %) | 80 | — | — | 15 | 7 | 50 | — | — |

Copolymers A-O are block copolymers obtained by a copolymerization in the presence of n-butyllithium, and copolymer P is an emulsion-polymerized SBR (SBR #1500 made by Japan Synthetic Rubber Co.).

The bonded styrene content in the copolymer was measured by the gas chromatography, the content of 1,2-bond in butadiene unit was measured by an infrared spectrometer, and the tan δ was measured by means of a mechanical spectrometer (amplitude of dynamic shear strain: 0.5%) made by Rheometrics Corp.

The bonded styrene content in the blocks (A) and (B) of the block copolymer, and the content of 1,2-bond in the butadiene unit of the copolymer were measured by sampling a reaction mass during the polymerization reaction. The chain lengths of the blocks (A) and (B) were deduced from the feed ratio of monomer/catalyst.

Various rubber compositions were produced by using copolymers A-P according to the compounding recipe shown in the following Table 2. The tan δ, breakage strength and low-temperature brittleness of the resulting rubber compositions were measured. Further, tires having a size of 165 SR 13 were produced by using the rubber compositions in their tread, and the tires were evaluated with respect to the wear resistance, rolling resistance, braking performance on wet road and resistance against nonpaved road.

The obtained results are shown in the following Table 3. The evaluation methods are as follows.

Breakage strength:

The breakage strength was measured according to JIS K6301.

Low-temperature brittleness:

The JIS hardness at −20° C. of a rubber composition was measured, and was indicated by an index as an indication of the low-temperature brittleness of the rubber composition. The higher is the hardness, the poorer the low-temperature brittleness is.

Wear resistance:

After a test tire was run on road by a distance of 10,000 km, the depth of the remaining groove was measured, and the running distance of the tire required for wearing 1 mm of its tread was calculated and compared with the standard running distance. Index 100 corresponds to the standard running distance. The larger index has a rubber composition, the higher the rubber composition is in the wear resistance.

Rolling resistance:

A test tire subjected to an internal pressure of 1.7 kg/cm$^2$ was trained on a steel drum with a diameter of 1,707.6 mm and a width of 350 mm, which was rotated by the driving of a motor, at a speed of 80 km/hr under a JIS 100% load (385 kg) for 30 minutes and thereafter the rotating speed of the drum was raised to 100 km/hr. Then, the driving of the motor was stopped to run the drum by inertia, during which the rolling resistance of the tire to the drum at a speed of 50 km/hr was measured on a basis of deceleration speed of drum and time change. Next, a net rolling resistance of the tire was determined by subtracting the previously calculated drum resistance from the measured value. The rolling resistance of the test tire was evaluated by the following formula:

$$\frac{\text{(Rolling resistance value of test tire)}}{5.2 \text{ kg}} \times 100$$

Index 100 corresponds to the rolling resistance of 5.2 kg. The smaller is the index, the more excellent the rolling resistance of the tire is.

Braking performance on wet road:

A test tire was suddenly braked during the running at a speed of 80 km/hr on a wet concrete road covered with water in a depth of 3 mm, and the running distance of the tire after the tire was locked was measured. The braking performance on wet road of the test tire was evaluated by following formula:

$$\frac{\text{(Running distance of test tire)}}{40 \text{ m}} \times 100$$

Index 100 corresponds to 40 m, and the smaller is the index, the more excellent the tire is in the braking performance on wet road.

Resistance against nonpaved road:

After a test tire was run on a nonpaved road in a distance of 10,000 km, 70% of which was occupied by a surface consisting mainly of gravel, the tire was taken off from the car, and formation of crack and cut on the tread surface was observed.

It can be seen from Table 3 that the rubber composition of the present invention is excellent in the wear resistance and breakage strength and further is remarkably excellent in the rolling resistance, running stability and low-temperature brittleness.

TABLE 2

| Rubber Composition No. | (Parts by weight) | | |
|---|---|---|---|
| | 1-14 | 15 | 16 |
| Copolymer N | | | 25 |
| Copolymer O | | | 25 |
| Copolymer listed in Table 1 | 50 | 100 | — |
| Natural rubber | 50 | | 50 |
| ISAF Carbon black | 50 | 50 | 50 |
| Aromatic oil | 10 | 10 | 10 |
| Zinc oxide | 4 | 4 | 4 |
| Stearic acid | 2 | 2 | 2 |
| N—Oxydiethylene-2-benzothiazylsulfenamide | 0.55 | 0.55 | 0.55 |
| Dibenzothiazyl disulfide | 0.3 | 0.3 | 0.3 |
| Sulfur | 2.0 | 2.0 | 2.0 |
| N—Phenyl-N'—isopropyl-p-phenylenediamine | 1.0 | 1.0 | 1.0 |

TABLE 3(a)

| Rubber composition No. | Present invention | | | Comparative rubber composition | | | | |
|---|---|---|---|---|---|---|---|---|
| | 1 | 2 | 3 | 4 | 5 | 6 | 7 | 8 |
| Copolymer | A | L | K | B | C | D | E | F |
| Tan δ (0° C.) | 0.520 | 0.480 | 0.600 | 0.610 | 0.570 | 0.573 | 0.780 | 0.296 |
| Tan δ (60° C.) | 0.090 | 0.085 | 0.095 | 0.150 | 0.089 | 0.092 | 0.250 | 0.07 |
| Breakage strength (kg/cm²) | 248 | 245 | 250 | 240 | 240 | 238 | 253 | 220 |
| Low-temperature brittleness | 105 | 102 | 107 | 120 | 106 | 109 | 140 | 98 |
| Wear resistance | 105 | 104 | 107 | 108 | 102 | 103 | 110 | 100 |
| Rolling resistance | 72 | 69 | 75 | 90 | 75 | 79 | 110 | 69 |
| Braking performance on wet road | 79 | 80 | 75 | 70 | 80 | 75 | 75 | 110 |
| Resistance against nonpaved road (formation of crack and cut) | none | none | none | none | none | " | none | " |

TABLE 3(b)

| Rubber composition No. | Comparative rubber composition | | | | | | | |
|---|---|---|---|---|---|---|---|---|
| | 9 | 10 | 11 | 12 | 13 | 14 | 15 | 16 |
| Copolymer | G | H | I | J | M | P | A | O, N |
| Tan δ (0° C.) | 0.800 | 0.280 | 0.780 | 0.500 | 0.400 | 0.3 | 0.800 | 0.700 |
| Tan δ (60° C.) | 0.270 | 0.07 | 0.255 | 0.123 | 0.086 | 0.220 | 0.150 | 0.155 |
| Breakage strength (kg/cm²) | 260 | 240 | 245 | 240 | 240 | 250 | 210 | 240 |
| Low-temperature brittleness | 170 | 98 | 153 | 115 | 100 | 100 | 160 | 180 |
| Wear resistance | 109 | 102 | 105 | 100 | 103 | 100 | 101 | 102 |
| Rolling resistance | 119 | 71 | 112 | 88 | 72 | 100 | 97 | 95 |
| Braking performance on wet road | 70 | 112 | 79 | 89 | 93 | 100 | 75 | 85 |
| Resistance against nonpaved road (formation of crack and cut) | somewhat | none | none | none | " | none | " | somewhat |

EXAMPLE 2

Various rubber compositions were produced according to the compounding recipe shown in the following Table 4, and evaluated in the same manner as described in Example 1. The obtained results are shown in Table 4.

It can be seen from Table 4 that the rubber composition of the present invention is excellent in the breakage strength and wear resistance and further is remarkably excellent in the rolling resistance, running stability and low-temperature brittleness.

TABLE 4

| Rubber composition No. | Present invention | | Comparative rubber composition | |
|---|---|---|---|---|
| | 17 | 18 | 19 | 20 |
| Compounding recipe (parts by weight) | | | | |
| Copolymer A | 50 | 50 | | |
| Copolymer B | | | 50 | 50 |
| BR01 | 20 | | 20 | |
| SBR1500 | 30 | 50 | 30 | 50 |
| ISAF Carbon black | 50 | 50 | 50 | 50 |

TABLE 4-continued

| Rubber composition No. | Present invention | | Comparative rubber composition | |
|---|---|---|---|---|
| | 17 | 18 | 19 | 20 |
| Aromatic oil | 10 | 10 | 10 | 10 |
| Zinc oxide | 4 | 4 | 4 | 4 |
| Stearic acid | 2 | 2 | 2 | 2 |
| N—Oxydiethylene-2-benzothiazylsulfenamide | 0.55 | 0.55 | 0.55 | 0.55 |
| Dibenzothiazyl disulfide | 0.3 | 0.3 | 0.3 | 0.3 |
| Sulfur | 2.0 | 2.0 | 2.0 | 2.0 |
| N—Phenyl-N'—isopropyl-p-phenylenediamine | 1.0 | 1.0 | 1.0 | 1.0 |
| Property | | | | |
| Tan δ (0° C.) | 0.48 | 0.58 | 0.47 | 0.45 |
| Tan δ (60° C.) | 0.085 | 0.092 | 0.080 | 0.072 |
| Breakage strength (kg/cm$^2$) | 240 | 245 | 240 | 238 |
| Low-temperature brittleness | 95 | 95 | 98 | 100 |
| Wear resistance | 104 | 104 | 100 | 100 |
| Rolling resistance | 70 | 73 | 97 | 100 |
| Braking performance on wet road | 80 | 82 | 95 | 100 |
| Resistance against nonpaved road (formation of crack and cut) | none | none | none | none |

What is claimed is:

1. A rubber composition for tires, consisting mainly of a rubber blend consisting of 20–95 parts by weight of a styrene-butadiene block copolymer and 80–5 parts by weight of a diene rubber; said styrene-butadiene block copolymer being a copolymer obtained by block copolymerizing styrene with 1,3-butadiene, consisting of a random copolymer block (A) and a random copolymer block (B), the fraction of the copolymer block (A) being 10–90% by weight, and having a total bonded styrene content of 10–40% by weight and a total vinyl bond content in the total bonded butadiene unit of 25–70% by weight; said random copolymer block (A) having a bonded styrene content of 20–50% by weight and a vinyl bond content in the butadiene unit of 40–75% by weight; and said random copolymer block (B) having a bonded styrene content of not higher than 10% by weight and a vinyl bond content in the butadiene unit of 20–50% by weight.

2. A rubber composition for tires according to claim 1, wherein said rubber blend consists of 20–80 parts by weight of the styrene-butadiene block copolymer and 80–20 parts by weight of a diene rubber having a glass transition temperature of not higher than −50° C.

* * * * *